US007983629B2

(12) United States Patent
Park et al.

(10) Patent No.: US 7,983,629 B2
(45) Date of Patent: Jul. 19, 2011

(54) PORTABLE TERMINAL WITH LOCKING RELEASE DEVICE

(75) Inventors: Jeong-Seok Park, Suwon-si (KR); Kwang-Ho Jung, Suwon-si (KR); June-Sop Kim, Seoul (KR); Sung-Moon Ok, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 843 days.

(21) Appl. No.: 11/779,063

(22) Filed: Jul. 17, 2007

(65) Prior Publication Data

US 2008/0020614 A1 Jan. 24, 2008

(30) Foreign Application Priority Data

Jul. 20, 2006 (KR) ........................ 10-2006-0067954

(51) Int. Cl.
*H04B 1/38* (2006.01)

(52) U.S. Cl. ................. 455/90.3; 455/575.1; 455/575.8; 455/575.3; 455/575.4; 455/556.1; 455/557; 379/428.01; 379/433.13; 379/433.11; 235/380; 235/375

(58) Field of Classification Search ................. 455/90.3, 455/575.1, 575.8, 575.3, 575.4, 556.1, 557
See application file for complete search history.

(56) References Cited

U.S. PATENT DOCUMENTS 5,636,275 A * 6/1997 Takagi et al. ............ 379/433.13
5,660,065 A * 8/1997 Edlund ............................ 70/58
5,682,045 A * 10/1997 Hayafuji et al. .............. 257/192
5,940,502 A * 8/1999 Hirai et al. .................... 379/446
6,104,621 A * 8/2000 Weadon et al. ............... 361/814
6,108,196 A * 8/2000 Jung ........................ 361/679.55
6,115,239 A * 9/2000 Kim ......................... 361/679.57
6,151,218 A * 11/2000 Pirdy et al. .................... 361/727
6,201,868 B1 * 3/2001 Murphy et al. .......... 379/433.01
6,295,358 B1 * 9/2001 Kubota .................... 379/433.13
6,330,331 B1 * 12/2001 Takagi et al. ............ 379/433.13
6,628,508 B2 * 9/2003 Lieu et al. ................ 361/679.09
6,724,623 B2 * 4/2004 Bovio et al. .............. 361/679.45
6,742,070 B2 * 5/2004 Fuchida ......................... 710/303
6,754,507 B2 * 6/2004 Takagi ....................... 455/550.1
6,831,229 B1 * 12/2004 Maattaa et al. ................. 174/66
7,200,965 B2 * 4/2007 Vor Keller et al. ........... 42/70.11
7,362,513 B2 * 4/2008 Kim et al. ..................... 359/704
7,366,555 B2 * 4/2008 Jokinen et al. ............. 455/575.8
7,369,882 B2 * 5/2008 Hwang et al. .............. 455/575.1

(Continued)

FOREIGN PATENT DOCUMENTS

KR 1020060019376 3/2006

*Primary Examiner* — Marceau Milord
(74) *Attorney, Agent, or Firm* — The Farrell Law Firm, P.C.

(57) ABSTRACT

Disclosed is a portable terminal with locking release device that includes a cover removably mounted on a side of a terminal housing; a first locking release having a button mounted in the terminal housing in such a manner as to be capable of linearly moving; and a second locking release having a rotary member mounted in the terminal housing and rotating as the button linearly moves, wherein the rotary member is rotated when the cover is mounted on the terminal housing, thereby linearly moving the cover. The portable terminal with the locking release device allows a battery cover to be easily mounted on or removed from a battery cover on a slim terminal, thereby stabilizing the battery mounting structure and enhancing the convenience in use.

20 Claims, 10 Drawing Sheets

U.S. PATENT DOCUMENTS

| | | | | |
|---|---|---|---|---|
| 7,376,449 | B2 * | 5/2008 | Mizuta et al. | 455/575.3 |
| 7,417,855 | B2 * | 8/2008 | Carnevali | 361/679.41 |
| 7,443,979 | B2 * | 10/2008 | Kim | 379/433.12 |
| 7,486,973 | B2 * | 2/2009 | Wee et al. | 455/575.1 |
| 7,492,602 | B2 * | 2/2009 | Kim et al. | 361/752 |
| 7,496,194 | B2 * | 2/2009 | Jeun | 379/433.11 |
| 7,496,388 | B2 * | 2/2009 | Kim | 455/575.4 |
| 7,583,987 | B2 * | 9/2009 | Park | 455/575.1 |
| 7,596,358 | B2 * | 9/2009 | Takagi | 455/90.3 |
| 7,610,067 | B2 * | 10/2009 | Cho et al. | 455/575.3 |
| 2005/0197173 | A1 * | 9/2005 | Wee et al. | 455/575.4 |
| 2007/0053504 | A1 * | 3/2007 | Sato et al. | 379/156 |
| 2007/0293285 | A1 * | 12/2007 | Kang et al. | 455/575.1 |

* cited by examiner

PORTABLE TERMINAL WITH LOCKING RELEASE DEVICE

PRIORITY

This application claims priority under 35 U.S.C. §119(a) of an application entitled "Portable Terminal With Locking Release Means" filed with the Korean Intellectual Property Office on Jul. 20, 2006, assigned Serial No. 2006-0067954, the contents of which are incorporated herein by reference.

BACKGROUND OF THE INVENTION

1. Field of the Invention

The present invention relates to a portable terminal, and in particular a locking release device for a cover mounted on a housing of a portable terminal to protect a battery pack.

2. Description of the Related Art

Conventionally, a portable terminal is an appliance carried by an individual user to allow the user to carry out voice communication with another user through one or more base stations or to use contents provided by service providers. Because such a portable terminal executes wireless transmission and reception, the user can enjoy voice communication or wireless Internet.

In early portable terminals, services provided through portable terminals were limited to voice communication, short message transmission, and the like. Recently, however, a banking service such as retail payment, a security service through home networking and the like have been enabled. In particular, multimedia services, such as downloading, reproducing and streaming services for sound and moving image files, have rapidly progressed.

In addition, as multimedia services are provided through portable terminals, the performance of portable terminals such as image-processing rate is continuously improved, and the mobile communication technology for transmitting information files of high capacity, such as moving image files, is also being continuously developed.

Meanwhile, as the integration densities of circuit devices have improved with the development in technology of fabricating portable terminals, portable terminals have been dramatically miniaturized. However, because large-sized display devices are increasingly required as the multimedia services are commercialized, only several kinds of components are miniaturized.

As miniaturization of portable terminals attend to difficulties associated with multimedia services as described above, efforts have recently concentrated on reducing the thicknesses of portable terminals to make the portable terminals as slim as possible.

A battery pack for a conventional portable terminal is configured by sealing a battery cell within a battery housing so that the battery pack can be directly mounted on or removed from the portable terminal. However, it is difficult to mount a battery pack on a slim portable terminal if the battery pack employs a battery housing for sealing a battery cell. That is, such a battery housing forms an obstacle in making a portable terminal slim. Furthermore, it is difficult to secure a solid construction for restraining such a battery pack in the mounted state on a terminal housing.

The weight of portable terminals is also increasingly reduced. However, in order to secure a sufficient battery capacity, there is a limit to reducing a battery cell's weights. As a result, the weight of a battery cell occupies a substantial part of the entire weight of a portable terminal. This also causes the battery cell to be released or fractured when an external impact is applied to the portable terminal.

In order to solve the above-mentioned problems, there has been proposed a construction in which a battery cell is received in the housing of a terminal and a cover is mounted on the portable terminal to protect the battery cell. Such a conventional cover for protecting a battery cell in a slim portable terminal has a construction adapted to be fixed to the terminal housing by placing the cover in close contact with the terminal housing and then linearly moving the cover by a predetermined section. With the construction for mounting such a cover through linear movement, although it is easy to mount the cover, it is inconvenient to remove the cover, because it is necessary for a user to linearly move the cover while compressing the cover in order to remove such a cover again.

SUMMARY OF THE INVENTION

Accordingly, the present invention has been made to solve the above-mentioned problems occurring in conventional systems, and an object of the present invention is to provide a portable terminal with a locking release device which allows a cover for protecting a battery pack to be easily mounted or removed.

Another object of the present invention is to provide a portable terminal with a locking release device which can prevent a cover for protecting a battery pack from being damaged in the process of removing the cover by allowing the battery pack to be easily mounted or removed.

In order to achieve the above-mentioned objects, there is provided a portable terminal with locking release including a cover removably mounted on a side of a terminal housing; a first locking release means having a button mounted in the terminal housing in such a manner as to be capable of linearly moving; and a second locking release means having a rotary member mounted in the terminal housing and rotating as the button linearly moves, wherein the rotary member is rotated when the cover is mounted on the terminal housing, thereby linearly moving the cover.

According to another aspect of the present invention, there is provided a portable terminal with locking release device including a terminal housing; a seating groove formed on a surface of the terminal housing; a cover removably mounted on the housing in such a manner as to close the seating groove as linearly moving on the housing; a first locking release provided in such a manner as to be capable of going in and out in relation to an outer surface of the terminal housing; and a second locking release positioned adjacent to the seating groove, the second locking release having a rotary member mounted on the terminal housing in such a manner as to be rotatable as the button goes in and out in relation to the terminal housing, wherein when the cover is mounted on the housing, the rotary member rotates and linearly moves the cover.

According to another aspect of the present invention, there is provided a portable terminal with locking release device including a terminal housing having a seating groove formed on a surface thereof; a cover removably mounted on the terminal housing in such a manner as to close the seating groove when it linearly moves on the terminal housing; a first locking release having a button provided in such a manner as to be capable of going in and out in relation to an outer surface of the terminal housing; and a second locking release positioned adjacent to the seating groove and having a rotary member provided in such a manner as to be rotatable on the terminal housing as the button goes in and out in relation to the terminal housing, wherein the first locking release includes a first driving projection extending from a surface of the button and interfering with the rotary member, and an elastic member providing elastic force acting in a direction for causing the button to project out of the housing, the second locking release includes a second driving projection projecting from a surface of the rotary member, and wherein when the button moves into the terminal housing in a state in which the cover is mounted on the terminal housing, the first driving projection rotates the rotary member and the second driving projection linearly moves the cover, thereby removing the cover from the terminal housing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
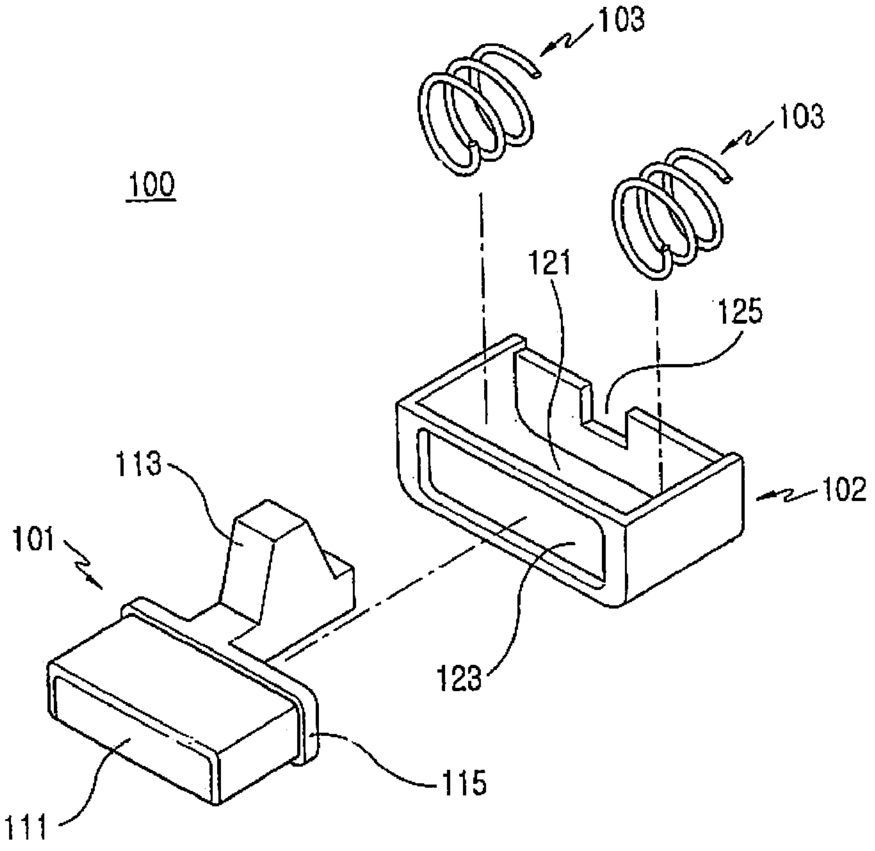
FIG. 1 is an exploded perspective view showing a first locking release among the locking release device of a portable terminal according to the present invention.

Hereinafter, preferred embodiments of the present invention will be described with reference to the accompanying drawings. In the following description and drawings, the same reference numerals are used to designate the same or similar components, so that repeated description on the same or similar components will be omitted. In the following description and accompanying drawings, detailed description for well-known functions and constructions, that are unnecessarily to describe the gist of the present invention are omitted for conciseness.

FIGS. 1 to 4 show first and second locking releases 100 and 200 which form the locking release device of a portable terminal according to of the present invention. As shown in FIGS. 1 to 4, the locking release device includes a button 101 linearly moving on a terminal housing 10 (see FIG. 5) of a terminal, and a rotary member 201 rotating on the terminal housing depending on the linear movement of the button 101.

Figure 2:
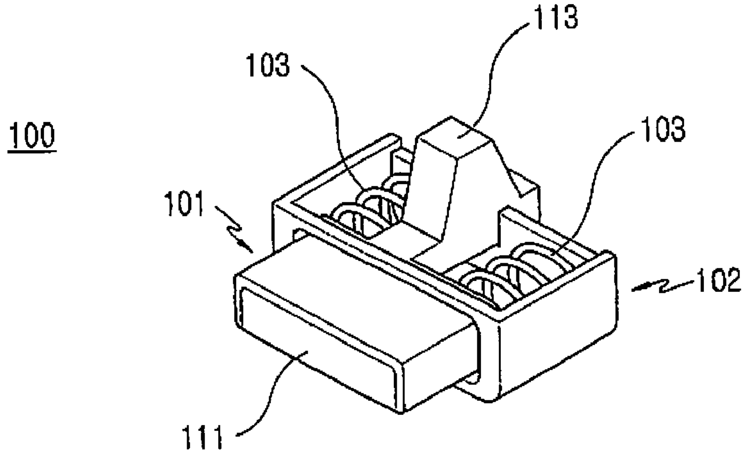
FIG. 2 is a perspective view showing the first locking release of FIG. 1 in an assembled state.

Referring to FIGS. 1 and 2, the first locking release includes the above-mentioned button 101, a module housing 102 for receiving the button 101, and a pair of elastic members 103 received in the module housing 102.

The module housing 102 provides a receiving space 121 capable of receiving the button 101 and the elastic members 103 and includes a driving hole 123 formed through a side wall and a driving recess 125 formed on the other side wall opposite to the driving hole 123. The button 101 linearly moves in a state of being received in the receiving space 121, so that an end of the button 101 appears outside of the module housing 102 projecting through the driving hole 123.

The elastic members 103 are received in the module housing 102 in such a manner that one end of each of them is supported on an inner surface of the module housing 102 and the other end is supported on the button 101 to provide elastic force. The elastic force provided by the elastic members 103 is applied in a direction for making the end 111 of the button 101 protrude to the outside of the module housing 102.

At this time, a support rib 115 is formed on the circumference of the button 101 to restrain the button 101 within the module housing 102. The support rib 115 extends along the circumference of the button 101 and is supported on an inner surface of the module housing 102 along the edges of the driving hole 123. Therefore, even if the elastic force 103 of the elastic members 103 is continuously acted on the button 101, the button 101 is retained within the module housing 102.

In addition, the button 101 has a first driving projection 113 projecting from a surface thereof. The first driving projection 113 projects from a side of the module housing 102. As the button 101 linearly moves, the first driving projection 113 linearly moves on the driving recess 125 and interferes with the rotary member 201.

Figure 3:
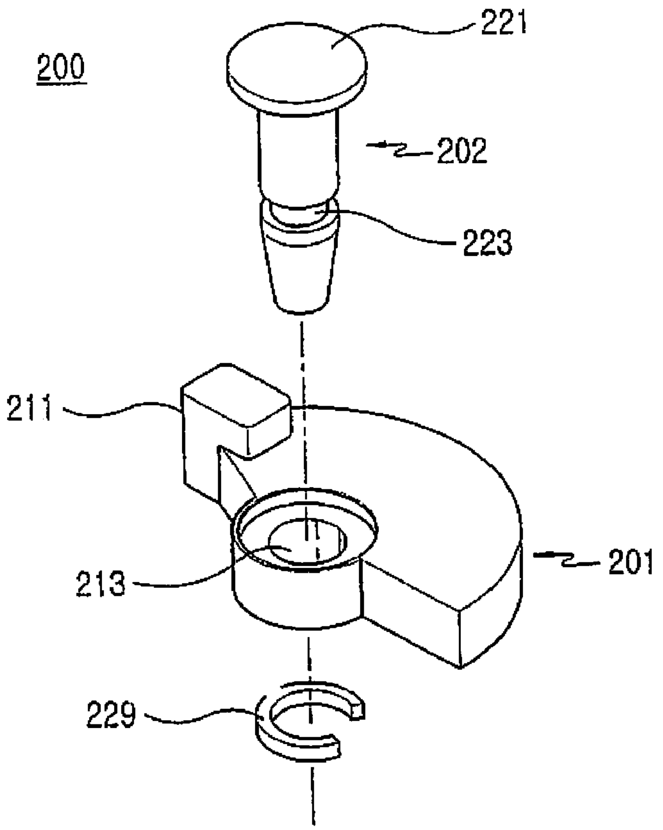
FIG. 3 is an exploded perspective view showing a second locking release, which cooperates with the first locking release of FIG. 1.
Figure 4:
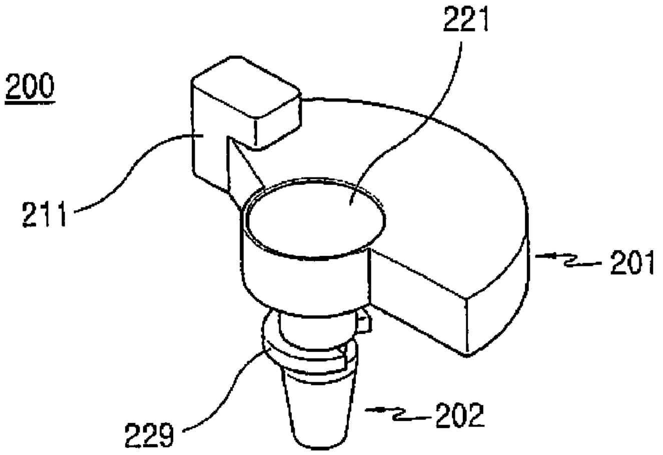
FIG. 4 is a perspective view showing the second locking release of FIG. 3 in an assembled state.

Referring to FIGS. 3 and 4, the second locking release 200 includes the above-mentioned rotary member 201, a rotary pin 202 for rotatably connecting the rotary member 201 to the terminal housing 10, and a C-ring 229.

The rotary member 201 is formed in a fan shape and has a rotary hole 213 formed through the rotary member 201 at a position corresponding to the apex of the fan shape, the rotary pin 202 being inserted through the rotary hole 213, and a second driving projection 211 formed at a position corresponding to an end of the circular arc area of the fan shape.

The rotary pin 202 includes a flat head 221 formed at one end thereof, and a locking groove 223 formed adjacent to the other end around the circumference thereof. The flat head 221 is diametrically extended from the circumference of the one end of the rotary pin 202 and supported by the rotary member 201. In addition, the rotary pin 202 extends through the rotary member 201 and ties the rotary member 201 on the terminal housing 10 in a rotatable state in cooperation with the C-ring 229.

Now, the construction for connecting the first and second locking release s 100 and 200 to the terminal housing 10 is described with reference to FIGS. 5 to 9.

Figure 5:
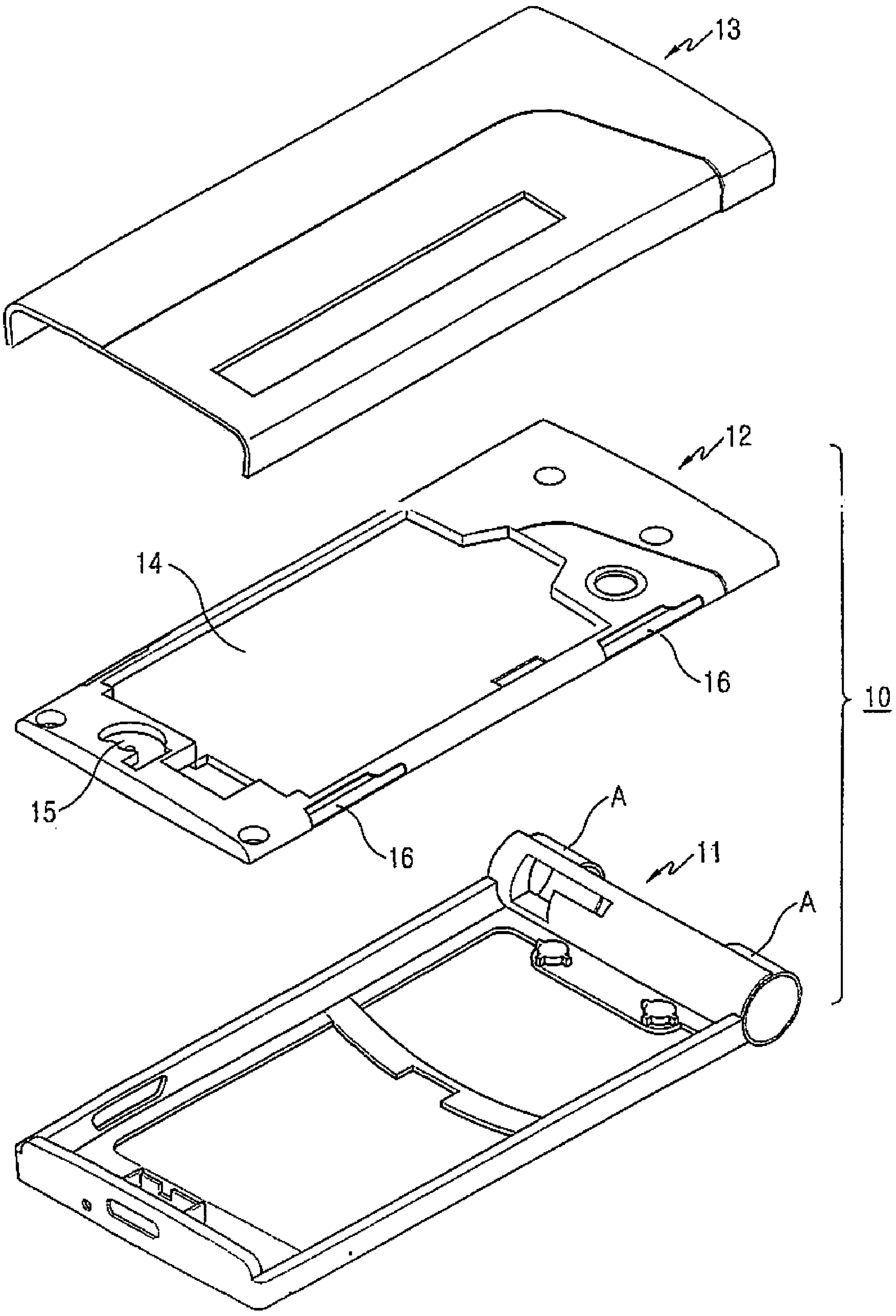
FIG. 5 is an exploded perspective view showing a terminal housing, in which the first and second locking releases of FIGS. 1 and 3 are mounted.
Figure 6:
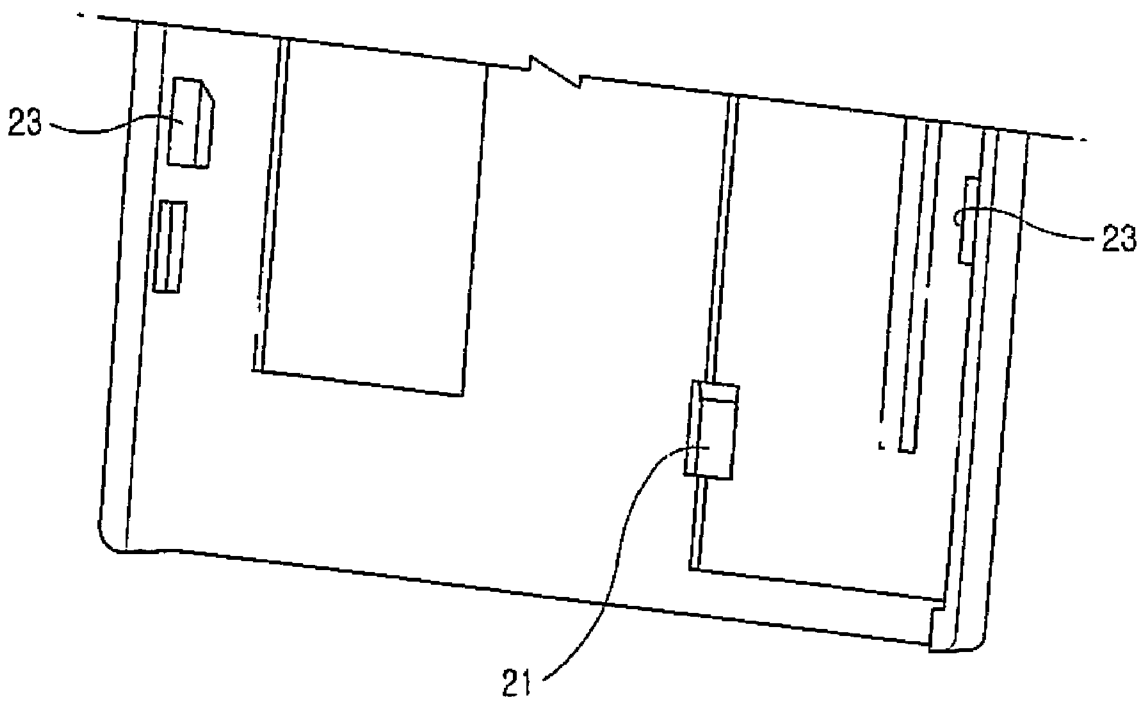
FIG. 6 is a partial perspective view of the cover of the terminal housing shown in FIG. 5.

Referring to FIGS. 5 and 6, the housing 10 of the portable terminal with the first and second locking releases 100 and 200 includes a front case 11, a rear case 12, and a cover 13 connected to the rear case 12.

The front case 11 has a front face opened to provide a space for installing a key pad and a display unit. The terminal housing 10 of to the present invention corresponds to a main body of a folder-type terminal, and the opened space in the front case 11 is equipped only with a key pad. In addition, the top end of the front case 11 is formed with a pair of hinge arms A, which are spaced apart from each other and form a part of a hinge structure capable of being engaged with a folder (not shown).

The rear case 12 includes a seating groove 14 formed on the rear face thereof for receiving a battery cell (not shown), and a receiving groove 15 formed adjacent to the seating groove 14. The receiving groove 15 is positioned below the seating groove 14 and provides a space for mounting the rotary member 201.

In addition, at least one first anchoring hook **16*a* (FIGS. 8 and 14) is formed at each end of the opposite sides of the rear case 12. The first anchoring hooks 16*a* partially project outwardly from the circumference of the rear case 12 and then extend downward toward the bottom side of the rear case 12**.

The cover 13 has a plurality of second anchoring hooks 23 and an escape groove 21, which are formed on the inner main surface of the cover 13. The second anchoring hooks project inwardly from the inner surfaces of the opposite sides of the cover 13 and then extend upwardly, wherein the second anchoring hooks 23 are engaged with the first anchoring hooks **16*a*, to fixedly tie the cover 13 to the terminal housing 10, more specifically to the rear case 12. The escape groove 21 (FIG. 6) formed on the inner main surface of the cover 13 corresponds with a part of the receiving groove 15 when the cover 13 is engaged with the rear case 12**.

An operation groove 16 is formed adjacent to each of the first anchoring groove **16*a* of the rear case 12 to provide a space for allowing the cover 13 to linearly move when the cover 13 is engaged with the rear case 12**.

If a battery cell is mounted in the seating groove 14 in a state in which the front case 11 and the rear case 12 are engaged with each other, a power source for the terminal including the terminal housing 10 is supplied. In addition, because the battery cell is exposed to the external environment, the cover 13 is mounted on the terminal housing 10 so as to protect the battery cell, and, at the same time, the terminal housing 10 takes an appearance which does not expose the battery cell.

Figure 7:
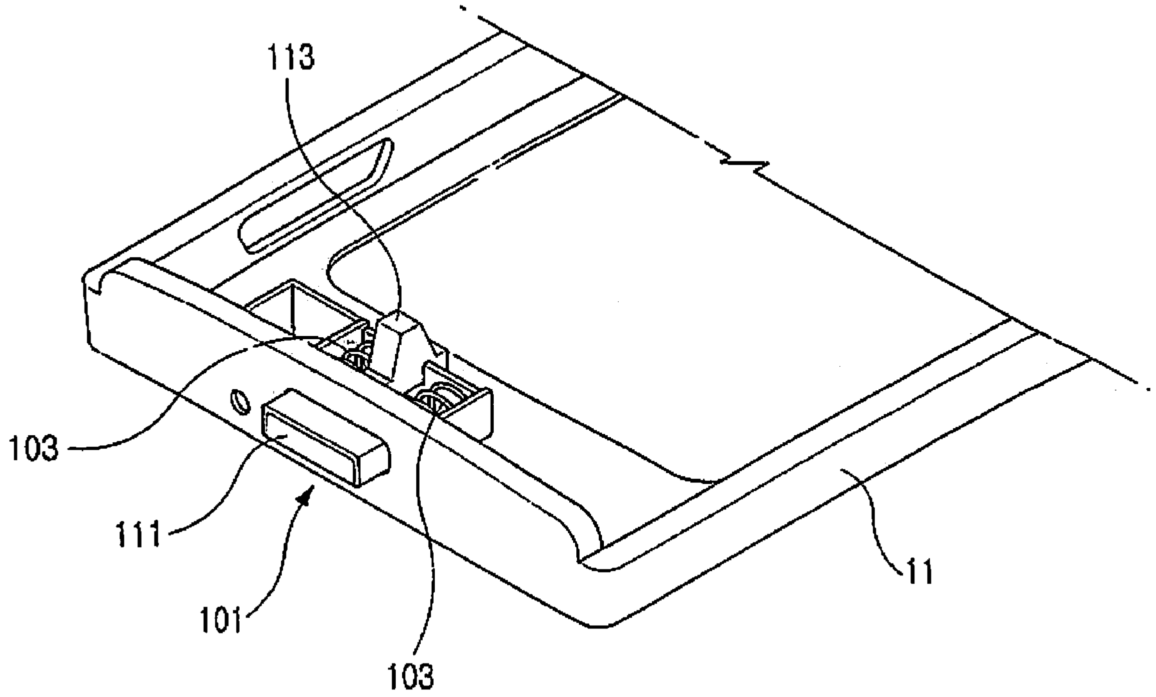
FIG. 7 is a partial perspective view showing the first locking release mounted on the front case of the terminal housing shown in FIG. 5.

FIG. 7 is a partial perspective view showing the first locking release 100 mounted in the terminal housing 10, more specifically, on the front case 11. The first locking release 100 is mounted in the terminal housing 10 adjacent to the lower end of the terminal housing 10. The module housing 102 is anchored to the inner side of the front case 11 and the end 111 of the button 101 projects to the outside at a position adjacent to the lower end of the terminal housing 10. The button 101 is mounted in the terminal housing 10 in such a manner as to be capable of reciprocation within a range of 1.2 mm.

Figure 8:
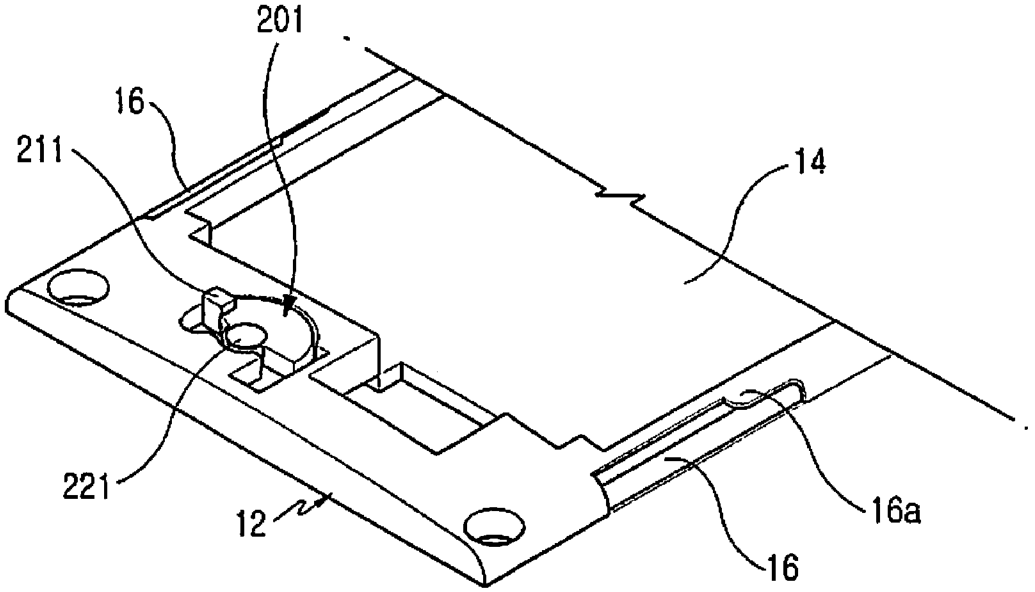
FIG. 8 is a partial perspective view showing the second locking release mounted on the rear case of the terminal housing shown in FIG. 5.
Figure 9:
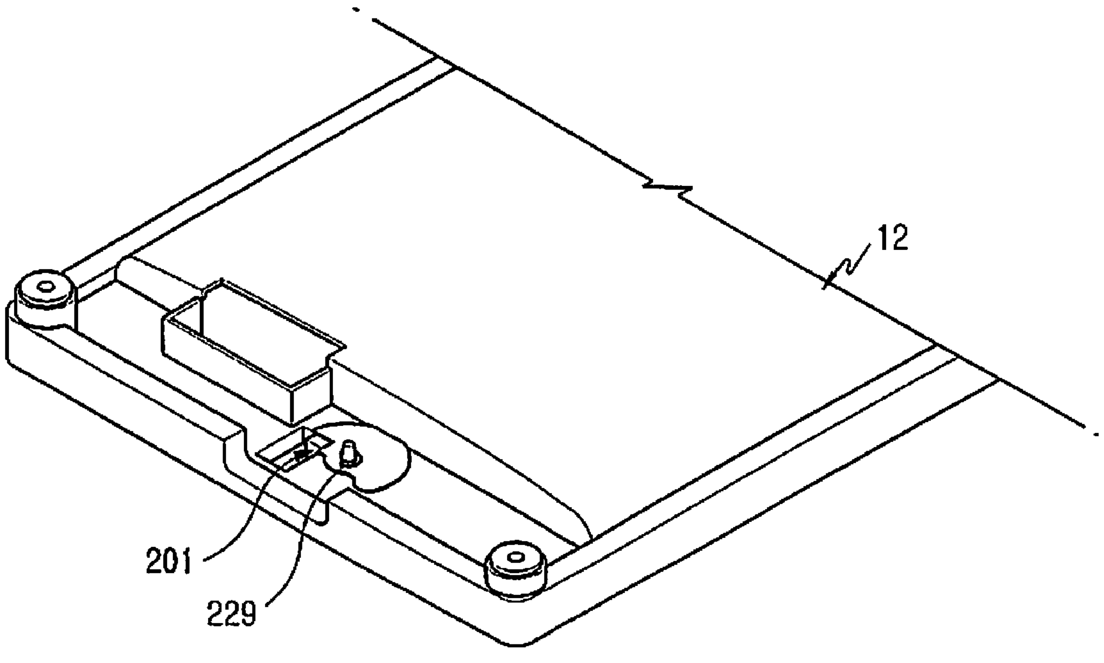
FIG. 9 is a partial perspective view showing the inner side of the rear case shown in FIG. 8.

FIGS. 8 and 9 are partial perspective views showing the second locking release 200 mounted in the terminal housing 10, more specifically on the rear case 12. The rotary member 201 is positioned within the receiving groove 15, and if the rotary pin 202 is inserted through the rotary hole 213, the flat head 221 is supported by the rotary member 201 and the end of the rotary pin 202 extends into the terminal housing 10. The locking groove 223 on the rotary pin 202 is also positioned within the terminal housing 10 and supported on an inner surface of the terminal housing 10 with the C-ring 229 engaged in the locking groove 223, whereby the rotary member 201 is tied in the terminal housing 10.

An opening extends through the inner side of the rear case 12 and a side portion of the receiving groove 15. The first driving projection of the first locking release 100 projects above the receiving groove 15 through the opening.

Meanwhile, an anchoring projection 17 (see FIG. 11) is formed on the inner wall of the receiving groove 15, and when the rotary member 201 is rotated, the anchoring projection 17 interferes with the circumference of the second driving projection 211.

Figure 10:
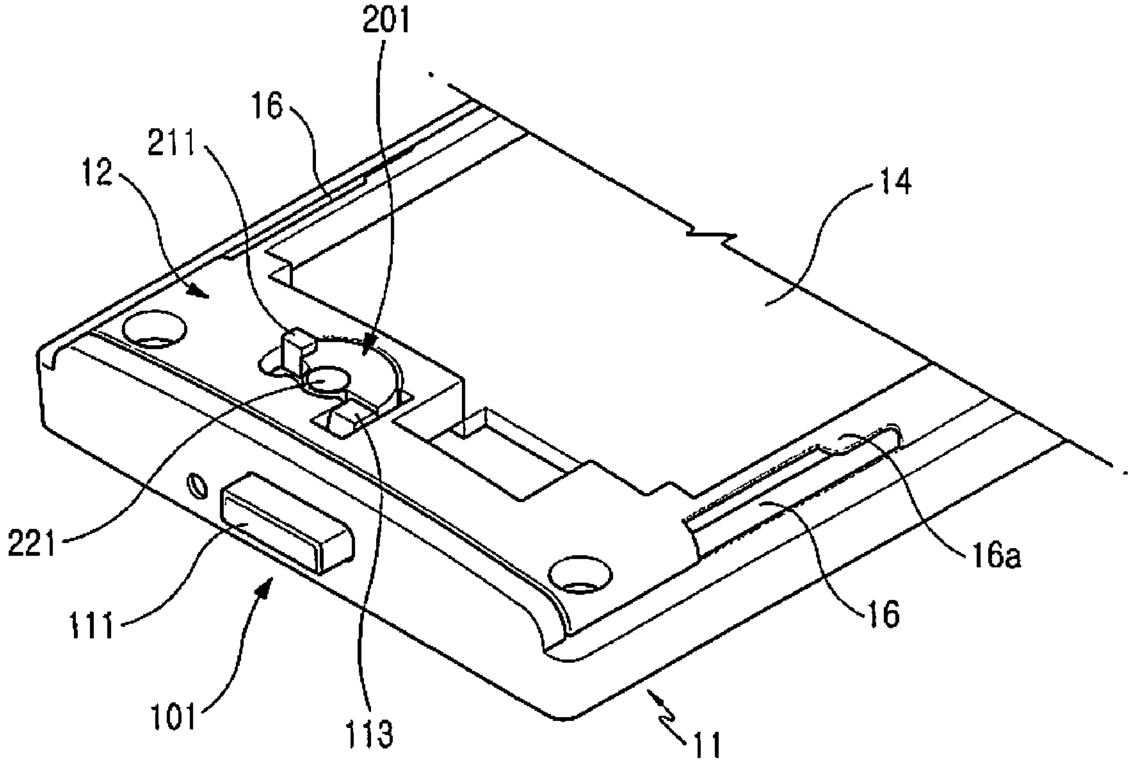
FIG. 10 is a partial perspective view showing the first and second locking releases mounted on the front and rear cases of the terminal housing shown in FIG. 5.
Figure 11:
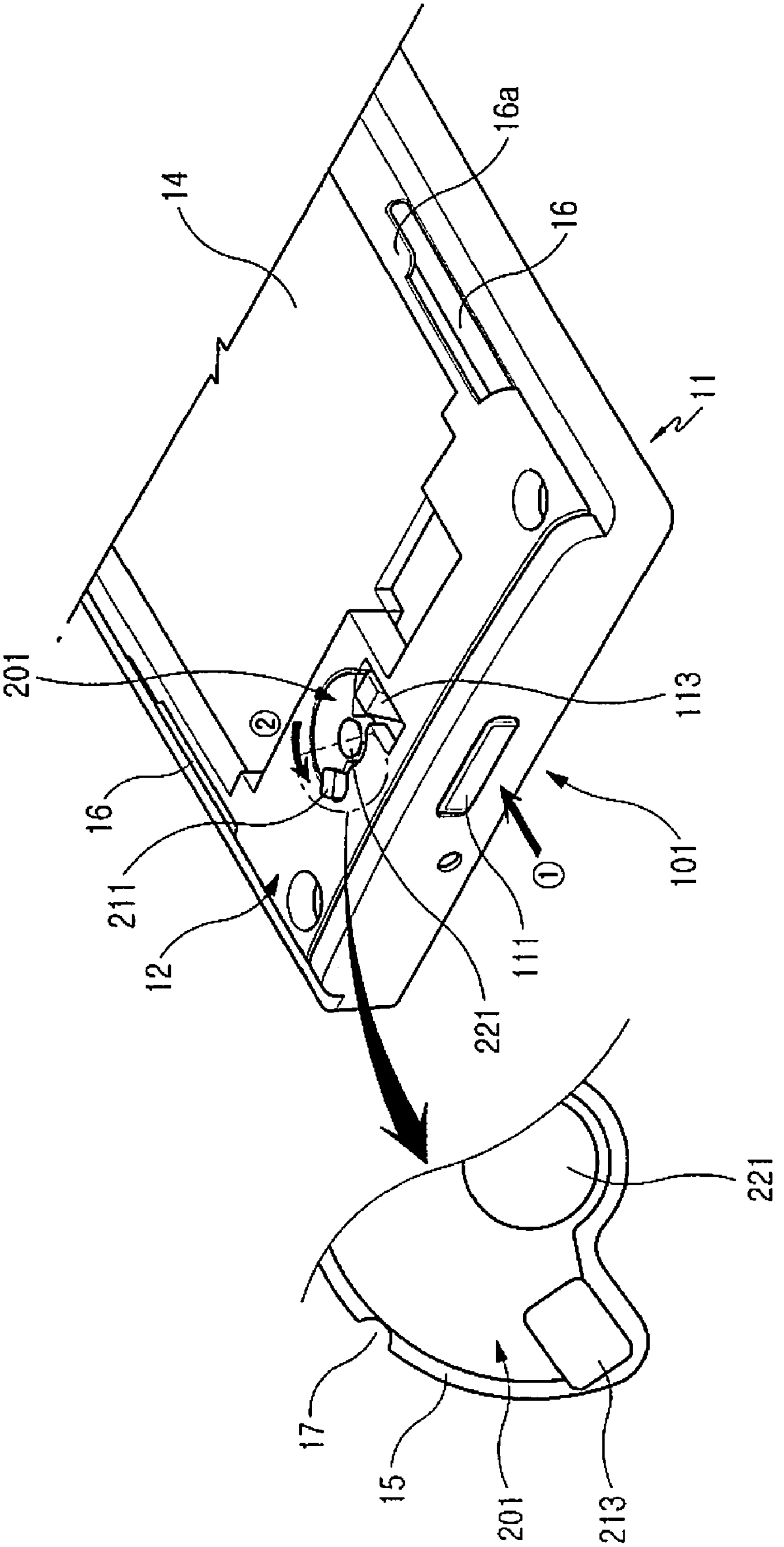
FIG. 11 is a partial perspective view showing the movement of the first and second locking releases shown in FIG. 10.

FIG. 10 is a partial perspective view showing the front and rear cases 11 and 12 engaged with each other with the first and second locking releases 100 and 200 mounted on the front and rear cases, respectively, and FIG. 11 is a partial perspective view showing the operation of the first and second locking releases 100 and 200.

Figure 12:
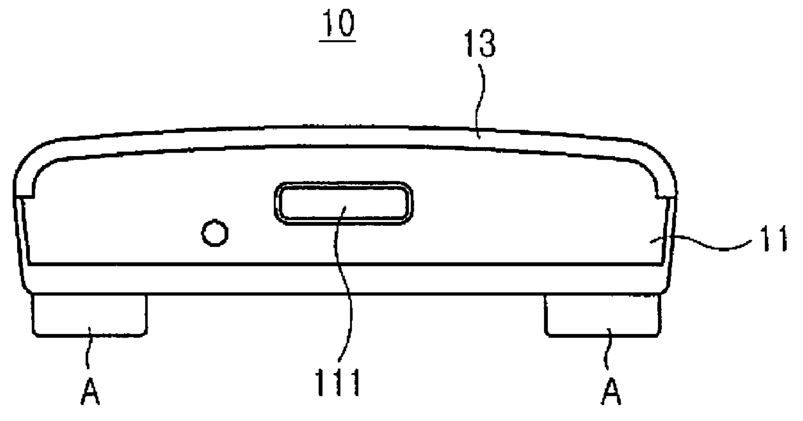
FIG. 12 is a front view showing the first and second locking releases mounted in the terminal housing shown in FIG. 5.
Figure 13:
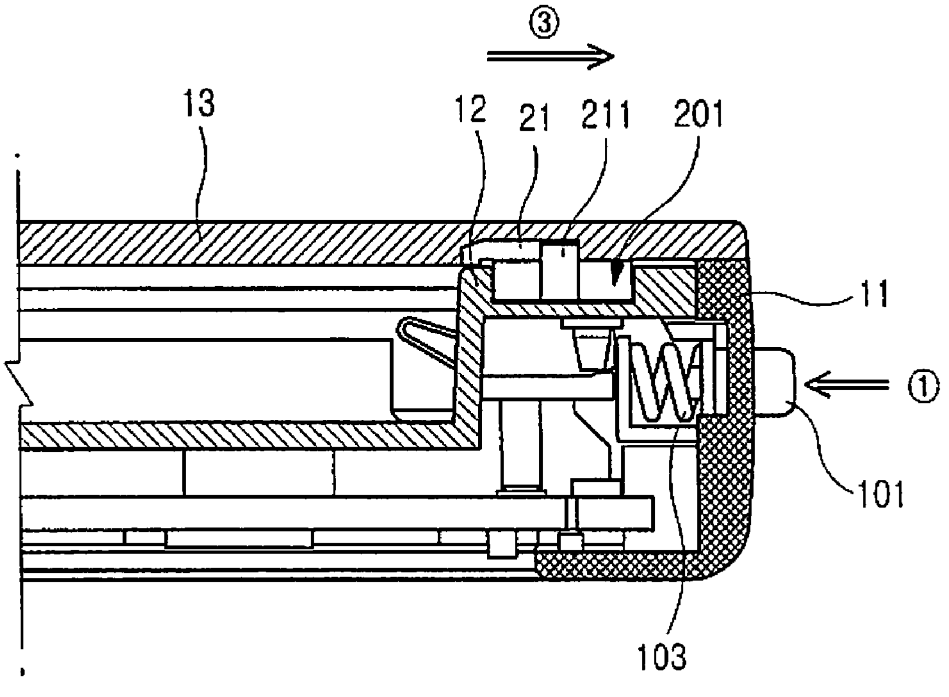
FIG. 13 is a partial cross-sectional view showing the portable terminal, in which the terminal housing shown in FIG. 12 is cutaway.
Figure 14:
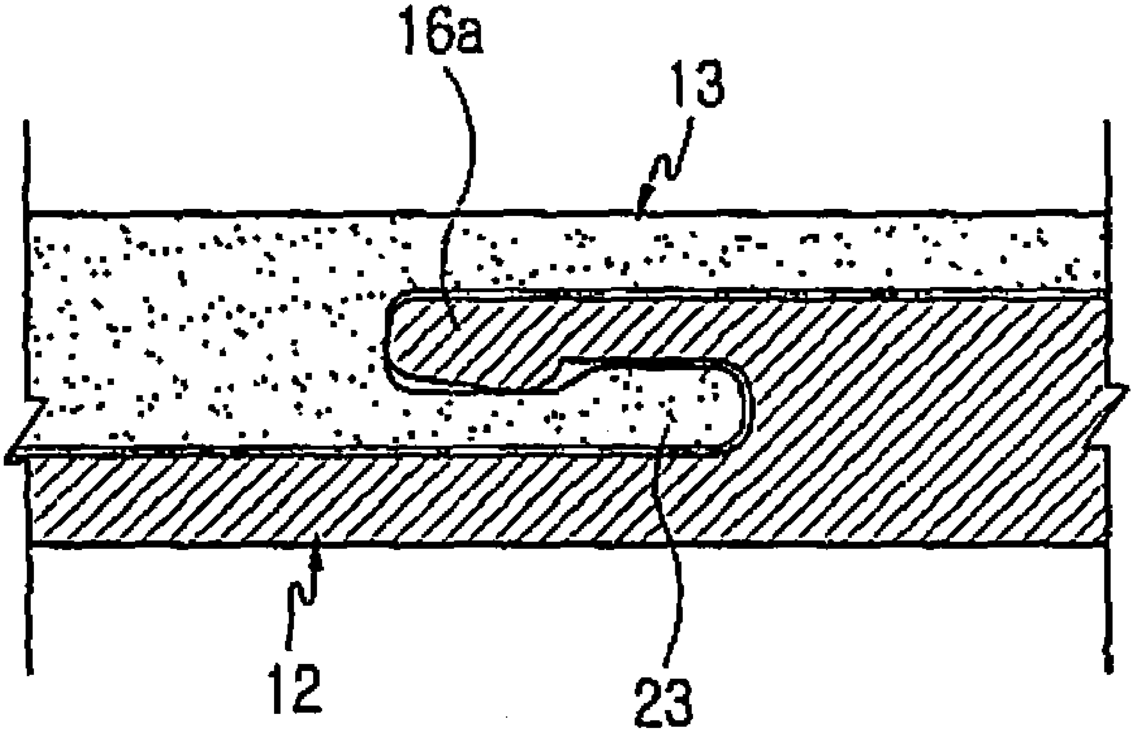
FIG. 14 is a partial cross-sectional view showing the cover assembled to the rear case of the terminal housing shown in FIG. 12.

If the front and rear cases 11 and 12 are engaged with each other in the state in which the first and second locking releases 100 and 200 are mounted, the first driving projection 113 projects above the receiving groove 15, thereby interfering with the rotary member 201. In addition, if the cover 13 is engaged with the rear case 12, the second driving projection 213 is positioned within the escape groove 21. FIGS. 12 to 14 show the cover 13 assembled in the housing 13.

As shown in FIG. 14, if the cover 13 is fully engaged with the rear case 12, the first anchoring hooks **16*a* and the second anchoring grooves 23 are engaged with each other 23. Therefore, as long as the cover 13 does not move in a direction for releasing the first and second anchoring hooks 16*a* and 23, the cover 13 is maintained in the state of being engaged with the rear case 12**.

At this time, the button 101 projects to the outside of the terminal housing 10, and the second driving projection 211 is positioned adjacent to a side wall of the escape groove and interferes with the anchoring projection 17 in the receiving groove 15. Therefore, the rotary member 201 is retained stationary within the receiving groove 15.

As shown in FIG. 11, if the user pushes the button 101 projecting to the outside of the terminal housing 10 (arrow ①), the button 101 moves into the terminal housing 10 and the first driving projection 113 rotates the rotary member 201 in the direction indicated by arrow ②. The rotation of the rotary member 201 cause the second driving projection 211 to be moved in the direction indicated by arrow ③ (see FIG. 13). The second driving projection 211 is positioned adjacent to an inner wall of the escape groove 21 (FIG. 6), and if the second projection 211 moves in the direction indicated by arrow ③, the inner wall of the escape groove 21 is pushed, so that the cover 13 is also moved in the direction indicated by arrow ③.

If the button 101 moves 1.2 mm, the rotary member 201 rotates about 40 degrees, which causes the second driving projection 211 to move about 2 mm in the direction indicated by arrow ③.

As the cover moves in the direction indicated by arrow ③, the engagement between the first and second anchoring hooks is released, whereby the user can simply remove the cover 13 from the terminal housing 10.

Consequently, merely by pushing the button 101, the cover 13 is caused to linearly move, so that the cover 13 can be easily and conveniently removed from the terminal housing 10 without being pressed.

Although specific embodiments of the present invention have been described, it will be appreciated that various modifications and variations can be made without departing from the scope of the present invention. For example, the first locking release 100 may form a space for receiving the button 101 and the elastic member 103 without using the module housing 103, thereby reducing the number of components. However, in the specific embodiment of the present invention, the first locking release 100 is configured in a single module type using the module housing 102. Accordingly, the present invention is intended to be determined not by the above embodiments but on the basis of the claims and equivalents thereof.

As described above, the inventive portable terminal includes a cover for protecting a battery cell received in a terminal housing and locking release device allowing the linear movement of the cover mounted in the housing, whereby the battery cover can be easily removed from the terminal housing. As a result, the battery mounting configuration for a slim terminal can be stabilized and the convenience in using such a slim terminal can be enhanced. Furthermore, because the cover can be caused to linearly move by pushing the button without directly pressing the cover, it is possible to prevent the cover from being fractured.

What is claimed is:

1. A portable terminal with locking release device, the locking release device comprising:

a cover removably mounted on a side of a terminal housing;

a first locking release having a button mounted in the terminal housing in such a manner as to be capable of linearly moving; and a second locking release having a rotary member mounted in the terminal housing and rotating as the button linearly moves, wherein the rotary member is rotated when the cover is mounted on the terminal housing, thereby linearly moving the cover, and wherein the first locking release comprises a module housing for receiving at least a part of the button, and an elastic member, one end of which is supported on the module housing and an other end of which is supported on the button, the button linearly moving within the module housing and the elastic member providing elastic force acting in a direction for causing an end of the button to project outside of the module housing.

2. The portable terminal with locking release device as claimed in claim 1, wherein the first locking release further comprises a first driving projection which extends from a surface of the button and projects out of a side of the module housing, wherein the first driving projection interferes with and rotates the rotary member when the button linearly moves.

3. The portable terminal locking release device as claimed in claim 1, wherein the first locking release further comprises:

a driving hole formed through a side wall of the module housing;

a driving recess formed on another side wall of the module housing opposite to the side wall formed with the driving hole; and a first driving projection which extends from a surface of the button and projects out of a side of the module housing, wherein an end of the button goes in and out in relation to the module housing through the driving hole and the first driving projection linearly reciprocates in the driving recess.

4. The portable terminal with locking release device as claimed in claim 3, wherein the first locking release further comprises a support rib projecting from the circumference of the button, wherein the support rib is supported on an inner surface of the module housing along a periphery of the driving hole.

5. The portable terminal with locking release device as claimed in claim 1, wherein the second locking release further comprises:

a rotary pin mounted in the terminal housing through the rotary member; and a C-ring fitted on an end of the rotary pin and tying the rotary pin in the terminal housing.

6. The portable terminal with locking release device as claimed in claim 5, wherein the rotary member is formed in a fan shape, the rotary pin being inserted through the rotary member at a position corresponding to an apex of a fan shape, and the rotary member is rotated on the terminal housing while being supported by the rotary pin.

7. The portable terminal with locking release device as claimed in claim 5, wherein the second locking release further comprises a second driving projection projecting out of a side of the rotary member, wherein the second driving projection interferes with the cover and linearly moves the cover when the rotary member rotates.

8. The portable terminal with locking release device as claimed in claim 7, further comprising an escape groove on an internal surface of the cover, wherein the second driving projection interferes with a side wall of the escape groove and linearly moves the cover.

9. The portable terminal with locking release device as claimed in claim 5, wherein the rotary pin projects to the inside of the terminal housing, wherein the C-ring is engaged with the rotary pin and supported on an inner surface of the terminal housing.

10. The portable terminal with locking release device as claimed in claim 9, further comprising a receiving groove formed adjacent to the seating groove, wherein the rotary member is rotatably positioned in the receiving groove.

11. The portable terminal with locking release device as claimed in claim 10, further comprising an anchoring projection formed on an inner wall of the receiving groove, wherein the anchoring projection interferes with the second driving projection, thereby limiting the rotation of the rotary member when the cover is mounted on the terminal housing.

12. The portable terminal with locking release device as claimed in claim 1, further comprising a seating groove formed in the terminal housing, wherein the cover closes the seating groove when it is mounted on the terminal housing.

13. The portable terminal with locking release device as claimed in claim 1, further comprising:

a plurality of first anchoring hooks formed on the terminal housing; and a plurality of second anchoring hooks formed on the cover, wherein the first and second anchoring hooks are engaged with each other as the cover linearly moves in a first direction when the cover is in close contact with the terminal housing.

14. The portable terminal with locking release device as claimed in claim 13, wherein the plurality of first anchoring hooks are formed at ends of opposite sides of the housing, respectively, and the plurality of second anchoring hooks are formed at the ends of the opposite sides of the cover.

15. A portable terminal comprising:

a terminal housing;

a seating groove formed on a surface of the terminal housing;

a cover removably mounted on the terminal housing in such a manner as to close the seating groove by linearly moving along the terminal housing;

a first locking release capable of going in and out in relation to an outer surface of the terminal housing; and a second locking release positioned adjacent to the seating groove, the second locking release having a rotary member mounted on the terminal housing and rotatable as the button linearly goes in and out in relation to the outer surface of the terminal housing, wherein when the cover is mounted on the housing, the rotary member rotates and linearly moves the cover, and wherein the first locking release comprises a module housing for receiving at least a part of the button, and an elastic member, one end of which is supported on the module housing and an other end of which is supported on the button, the button linearly moving within the module housing and the elastic member providing elastic force acting in a direction for causing an end of the button to project outside of the module housing.

16. The portable terminal as claimed in claim 15, further comprising:

a plurality of first anchoring hooks formed at ends of opposite sides of the terminal housing and extending in a longitudinal direction of the terminal housing; and a plurality of second anchoring hooks formed at ends of opposite sides of the cover and extending in the longitudinal direction, wherein the first and second anchoring hooks engage with and disengage from each other as the cover linearly moves along the terminal housing.

17. The portable terminal as claimed in claim 15, wherein the rotary member rotates when the button moves into the terminal housing.

18. The portable terminal as claimed in claim 15, wherein the first locking release further comprises a first driving projection extending from a surface of the button and interfering with the rotary member.

19. The portable terminal as claimed in claim 15, wherein the second locking release further comprises a second driving projection projecting from a surface of the rotary member, and the cover further comprises an escape groove formed on an inner surface thereof, the second driving projection interfering with a side wall of the escape groove and linearly moving the cover as the rotary member rotates.

20. A portable terminal comprising:

a terminal housing having a seating groove formed on a surface thereof;

a cover removably mounted on the terminal housing in such a manner as to close the seating groove by linearly moving on the terminal housing;

a first locking release having a button provided capable of going in and out in relation to an outer surface of the terminal housing; and a second locking release positioned adjacent to the seating groove and having a rotary member rotating on the terminal housing as the button goes in and out in relation to the terminal housing, wherein the first locking release comprises a first driving projection extending from a surface of the button and interfering with the rotary member, and an elastic member providing elastic force acting in a direction causing the button to project out of the housing, the second locking release comprises a second driving projection projecting from a surface of the rotary member, and wherein, when the button moves into the terminal housing in a state in which the cover is mounted on the terminal housing, the first driving projection rotates the rotary member and the second driving projection linearly moves the cover, thereby removing the cover from the terminal housing.

* * * * *